United States Patent
Boucard et al.

(10) Patent No.: US 9,882,839 B2
(45) Date of Patent: *Jan. 30, 2018

(54) ZERO-LATENCY NETWORK ON CHIP (NOC)

(71) Applicant: QUALCOMM Technologies Inc., San Diego, CA (US)

(72) Inventors: Philippe Boucard, Le Chesnay (FR); Jean-Jacques Lecler, Antibes (FR)

(73) Assignee: QUALCOMM Incorporated, San Diego, CA (US)

( * ) Notice: Subject to any disclaimer, the term of this patent is extended or adjusted under 35 U.S.C. 154(b) by 335 days.

This patent is subject to a terminal disclaimer.

(21) Appl. No.: 14/720,947

(22) Filed: May 25, 2015

(65) Prior Publication Data
US 2015/0256486 A1  Sep. 10, 2015

Related U.S. Application Data

(63) Continuation of application No. 12/579,346, filed on Oct. 14, 2009, now Pat. No. 9,049,124.

(30) Foreign Application Priority Data

Oct. 13, 2009  (FR) ...................................... 09 57137

(51) Int. Cl.
*G06F 3/00* (2006.01)
*H04L 12/28* (2006.01)
(Continued)

(52) U.S. Cl.
CPC ...... *H04L 49/3072* (2013.01); *G06F 13/4009* (2013.01); *H04L 45/245* (2013.01);
(Continued)

(58) Field of Classification Search
None
See application file for complete search history.

(56) References Cited

U.S. PATENT DOCUMENTS 7,551,565 B2  6/2009  Stieglitz et al.
7,551,623 B1  6/2009  Feroz et al.
(Continued)

FOREIGN PATENT DOCUMENTS

EP  1688847 A1  8/2006
WO  2006018751 A1  2/2006

OTHER PUBLICATIONS

Correa E., et al., "A Heterogeneous Router for Network-on-Chip,"[online], Retrived from: , 2004, 6 pages.
(Continued)

*Primary Examiner* — Hyun Nam
(74) *Attorney, Agent, or Firm* — Muncy, Geissler, Olds & Lowe

(57) ABSTRACT

Packet format configurability is extended for packets transported on physical links of an Intellectual Property (IP) core interconnect by using at least two independent parameters: one parameter governing data-width and one parameter governing latency penalty. The at least two independent parameters allow creation of transport protocol packets without additional latency insertion, which is useful for low-latency applications. The at least two independent parameters also allow creation of narrow packets with multi-cycle additional latency, which is useful for latency tolerant, area sensitive applications.

30 Claims, 7 Drawing Sheets

(51) Int. Cl.
   *H04L 12/935* (2013.01)
   *H04L 12/709* (2013.01)
   *H04L 12/801* (2013.01)
   *H04L 12/933* (2013.01)
   *G06F 13/40* (2006.01)
   *H04L 29/06* (2006.01)

(52) U.S. Cl.
   CPC ............ *H04L 47/10* (2013.01); *H04L 49/109* (2013.01); *H04L 69/22* (2013.01); *G06F 2213/0038* (2013.01); *Y02B 60/33* (2013.01)

(56) References Cited

U.S. PATENT DOCUMENTS

| | | |
|---|---|---|
| 2007/0002862 A1 | 1/2007 | Kanekar et al. |
| 2007/0058679 A1* | 3/2007 | Pelletier ................ H04W 28/06 370/477 |
| 2007/0299993 A1 | 12/2007 | Vorbach et al. |
| 2008/0205432 A1 | 8/2008 | Gangwal |
| 2009/0182987 A1* | 7/2009 | Mejdrich ............. G06F 1/3203 712/215 |
| 2011/0085550 A1 | 4/2011 | Lecler et al. |

OTHER PUBLICATIONS

Search Report and Written Opinion, French Patent Application No. FR0957137, dated Jul. 21, 2010, 7 pages.

Zeferino C., et al., "Paris: A Parameterizable Interconnect Switch for Networks-on-Chip," IEEE Xplore [online], Retrieved from URL: , Sep. 2004, 6 pages.

\* cited by examiner

ZERO-LATENCY NETWORK ON CHIP (NOC)

CROSS-REFERENCE TO RELATED APPLICATION

This application for patent claims priority to French Patent Application No. 09 57137 entitled "Zero-Latency Network on Chip (NOC)" filed Oct. 13, 2009, and U.S. patent application Ser. No. 12/579,346 entitled "ZERO-LATENCY NETWORK ON CHIP (NOC)" filed Oct. 14, 2009, each of which are assigned to the assignee hereof and expressly incorporated by reference herein in their entireties.

TECHNICAL FIELD

This subject matter is related generally to semiconductor Intellectual Property (IP) interconnect technology.

BACKGROUND

Many semiconductor designs, both in Integrated Circuit (IC) and in Field Programmable Gate Array (FPGA) applications are constructed in a modular fashion by combining a set of IP cores, such as Central Processing Units (CPUs), Digital Signal Processors (DSPs), video and networking processing blocks, memory controllers and others with an interconnect system. The interconnect system implements the system-level communications of the particular design. The IP cores are typically designed using a standard IP interface protocol, either public or proprietary. These IP interface protocols are referred to as transaction protocols. An example transaction protocol is Open Core Protocol (OCP) from OCP-IP, and Advanced Extensible Interface (AXI™) and Advanced High-performance Bus (AHB™) from Arm Inc. As semiconductor designs have evolved from relatively small, simple designs with a few IP cores into large, complex designs which may contain hundreds of IP cores, the IP core interconnect technology has also evolved.

The first generation of IP core interconnect technology consisted of a hierarchical set of busses and crossbars. The interconnect itself consists mostly of a set of wires, connecting the IP cores together, and one or more arbiters which arbitrate access to the communication system. A hierarchical approach is used to separate high-speed, high performance communications from lower-speed, lower performance subsystems. This solution is an appropriate solution for simple designs. A common topology used for these interconnects is either a bus or a crossbar. The trade-off between these topologies is straightforward. The bus topology has fewer physical wires which saves area and hence cost, but it is limited in bandwidth. The wire-intensive crossbar approach provides a higher aggregate communication bandwidth.

The above approach has a severe limitation in that the re-use of the IP cores is limited. The interfaces of all the IP cores connecting to the same interconnect are required to be the same. This can result in the re-design of the interface of an IP core or the design of bridge logic when a particular IP core needs to be used in another system.

This first generation of interconnect also implements a limited amount of system-level functions. This first generation of IP core interconnect technology can be described as a coupled solution. Since the IP interfaces are logically and physically not independent from each other, they are coupled such that modifying one interface requires modifying all the interfaces.

The second generation of IP interconnect is a partially decoupled implementation of the above described bus and crossbar topologies. In these solutions, the internal communication protocol of the communications system, or transport protocol, is decoupled from the IP interface protocol, or transaction protocol. These solutions are more flexible with regards to IP reuse as in these solutions the semiconductor system integrator can connect IP cores with different interfaces to the same communication system through some means of configurability.

The third generation of IP core interconnect technology is the Network-on-a-chip (NoC) which implements not only decoupling between transaction and transport layers, but also a clean decoupling between transport and physical layers. The key innovation enabling this solution is the packetization of the transaction layer information. The command and data information that is to be transported is encapsulated in a packet and the transport of the packet over the physical medium is independent of the physical layer.

In existing NoC solutions, bursts of information at the transaction layer are converted into packets, which are transported over physical links. A NoC packet is constructed of two parts: a header and a payload. The payload usually includes, but is not limited to, data information, with optionally other data-related information such as byte-enable and/or protection or security information. The header contains two types of information: first, transaction protocol level information that is transferred end-to-end without being changed by the interconnect and secondly, transport protocol level information needed and used by the interconnect to transport the payload correctly from one IP core to another through the interconnect. The term "correctly" does not refer only to routing, but also implies meeting other system level requirements, such as latency, quality of service, bandwidth requirements, etc.

In many transaction layer protocols, the command and data information of the transaction in a burst are presented in the same clock cycle. In the conversion process from transaction layer to transport layer, the header is created and used as the first one of several words in the packet. This packetization may insert one or more cycles of latency since the header is transported over the physical links during one or more clock cycles before the data is transported.

While an IP core can be re-used from design to design, the implementation of a NoC is likely to change as the NoC implements the system-level communications which are design specific. The number of IP cores, latency, bandwidth, power, and clock-speed are some of the variables that impact the requirements on the NoC. Hence, mechanisms have been developed to automate the design of an instance of a NoC to rapidly construct a NoC instance. During instantiation of a NoC, the width of the link, and therefore the width of the packet, is configurable by the user and this configurability allows the user to make an optimal trade-off between the number of wires in the interconnect system, latency and bandwidth.

In existing NoC solutions, the configurability that is available in the construction of a packet is limited to the selection of a value of one parameter. Using this single-parameter, a packet width can be selected. The values of the width of the packet and the latency penalty due to the header of the packet are intrinsically linked. Accordingly, a change in value of the packet width parameter can result in additional latency insertion.

SUMMARY

The disclosed implementations include packet formats for use in NoC interconnect solutions. In some implementations, packet format configurability is extended for packets transported on physical links of an IP core interconnect by using at least two independent parameters: one parameter governing data-width and one parameter governing latency penalty. The at least two independent parameters allow creation of transport protocol packets without additional latency insertion, which is useful for low-latency applications. The at least two independent parameters also allow creation of narrow packets with multi-cycle additional latency, which is useful for latency tolerant, area sensitive applications.

DETAILED DESCRIPTION

Example NoC

Figure 1:
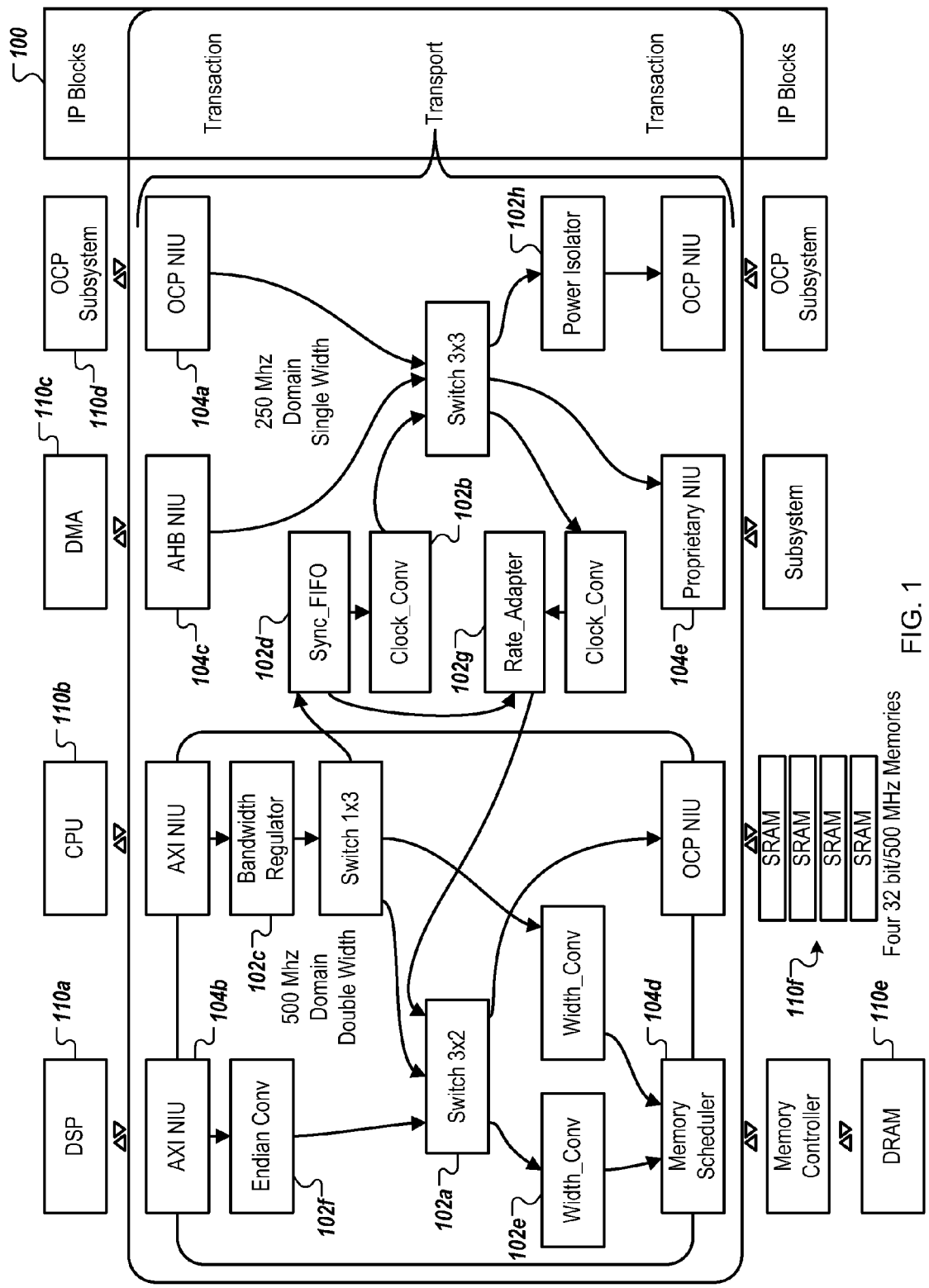
FIG. 1 is a block diagram of an example NoC.

FIG. 1 is a block diagram of an example NoC 100. In some implementations, NoC 100 can be constructed out of a set of IP elements 102 which communicate with each other through a packet-based transport-protocol. Examples of IP elements 102 include but are not limited to: switches 102a, clock converters 102b, bandwidth regulators 102c, sync First In First Out (FIFO) 102d, width converters 102e, Endian converters 102f, rate adaptors 102g, power isolators 102h and other IP elements.

In some implementations, at the edges of NoC 100, Network Interface Units (NIUs) 104 implement a conversion between transaction protocol and transport protocol (ingress) and vice versa (egress). Some examples of NIUs for transaction protocols include but are not limited to: OCP NIU 104a, AXI™ NIU 104b, AHB™ NIU 104c, memory scheduler 104d and a proprietary NIU 104e. The NIUs 104 couple to various IP cores 110. Some examples of IP cores are DSP 110a, CPU 110b, Direct Memory Access 110c, OCP subsystem 110d, DRAM Controller 110e, SRAM 110f and other types of IP cores.

In NoC 100, the transport protocol is packet-based. The commands of the transaction layer can include load and store instructions of one or more words of data that are converted into packets for transmission over physical links. Physical links form connections between the IP elements. An implementation of a transport port protocol used by NoC 100 is described in reference to FIG. 2.

Example Physical Link

Figure 2:
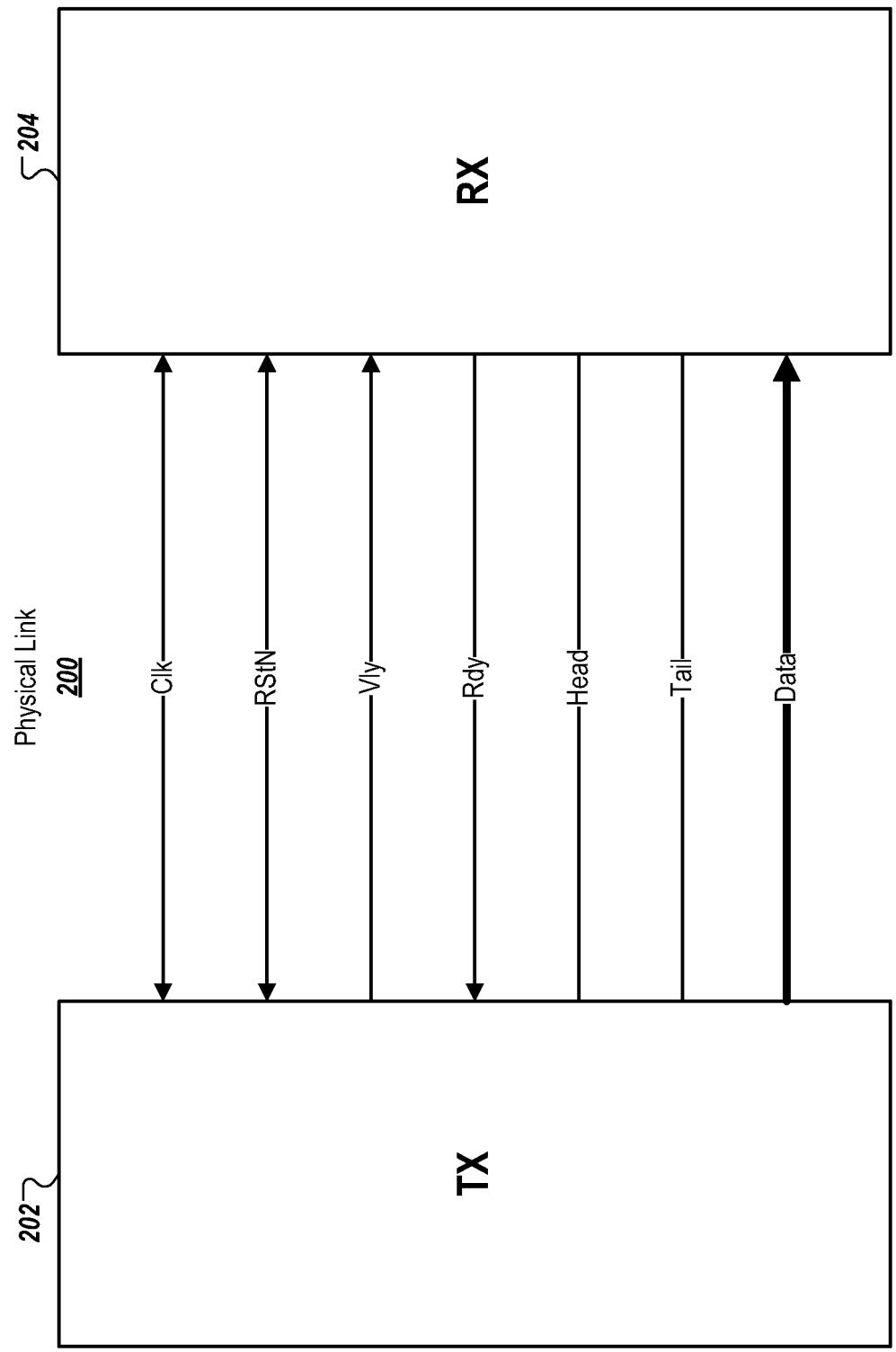
FIG. 2 is a block diagram of an example physical link connecting a transmitter and a receiver in the NoC of FIG. 1.

FIG. 2 is a block diagram of an example physical link 200 connecting a transmitter 202 (TX) and a receiver 204 (RX) in NoC 100 of FIG. 1. A transport protocol socket can be used to transfer a packet from transmitter 202 to receiver 204 over physical link 200. The socket can contain flow control signals (Vld, Rdy), framing signals (Head, Tail) and information signals (Data). The socket can be a synchronous interface working on rising edges of a clock signal (Clk). One active low reset signal (RStN) can also be included in the physical link 200. The logical meaning of the different signals in this particular implementation is described next.

Vld: Indicates that transmitter 202 presents valid information (Head, Tail and Data) in a current clock cycle. When Vld is negated, transmitter 202 drives an X value on Head, Tail and Data and receiver 204 discards these signals. Once transmitter 202 asserts Vld, the signals Head, Tail, Data and Vld remain constant until Rdy is asserted by receiver 204. In this particular implementation, the width of Vld can be 1. Other widths can also be used.

Rdy: Indicates that receiver 204 is ready to accept Data in a current clock cycle. Rdy can depend (in combination) on Vld, Head, Tail and Data, or can only depend on the internal state of receiver 204. In this particular implementation, the width of Rdy can be 1. Other widths can also be used.

Head: Indicates a first clock cycle of a packet. In this particular implementation, the width of Head is 1. Other widths can also be used.

Tail: Indicates a last clock cycle of a packet. In this particular implementation, the width of Tail is 1. Other widths can also be used.

Data: Effective information transferred from transmitter 202 to receiver 204. Data contains a header and a payload. A data word transfer can occur when the condition Vld AND Rdy is true. The width of Data can be configurable.

Example Packet Transport Sequence

Figure 3:
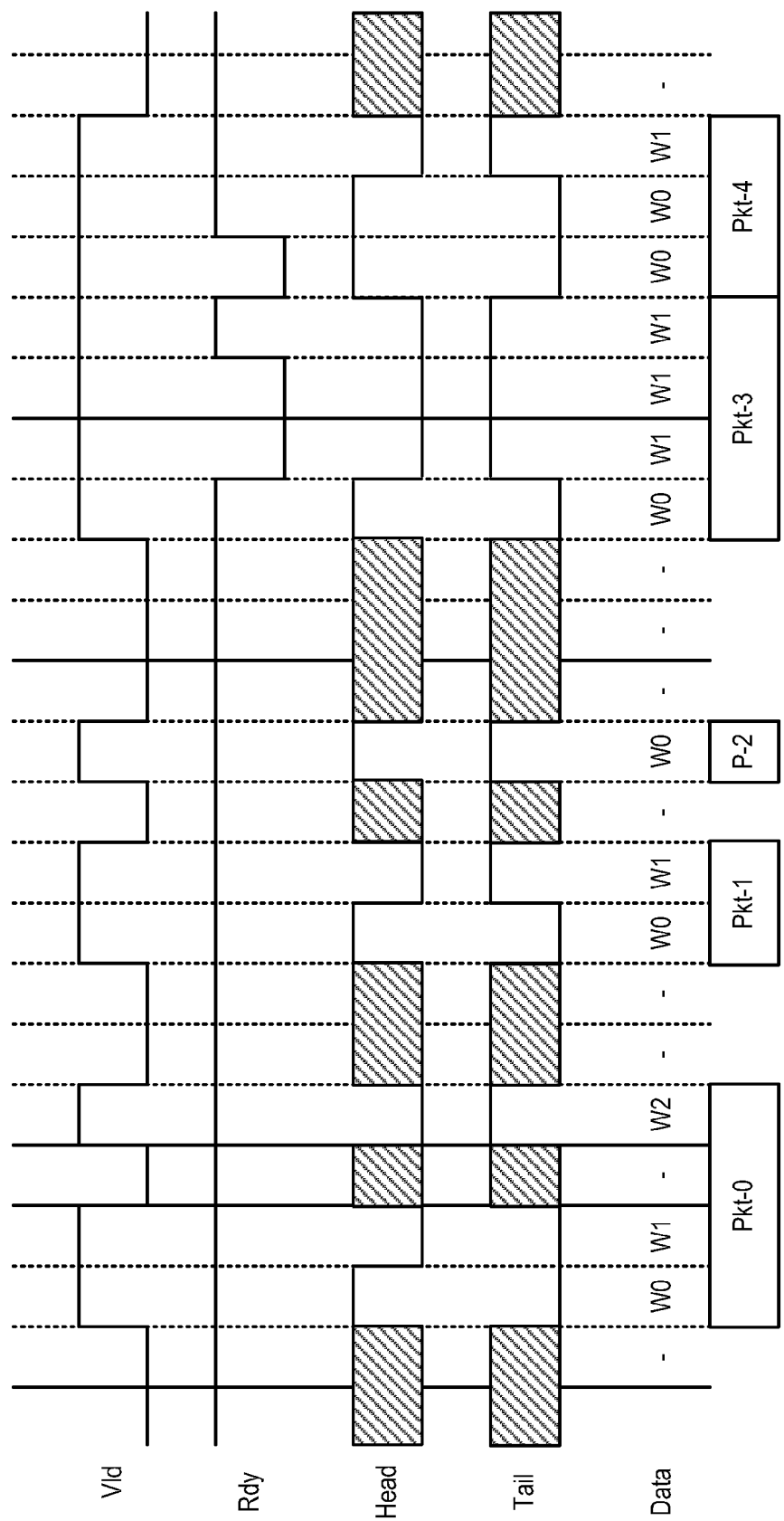
FIG. 3 is an example sequence of packet transport over the example link shown in FIG. 2.

FIG. 3 is an example sequence of packet transport over the link of FIG. 2. In some implementations, a packet starts when Vld and Head are asserted, and completes when Vld and Tail are asserted. A single cycle packet can have both Head and Tail asserted. Inside a packet, Head is negated when Vld is asserted, and outside a packet, Head is asserted simultaneously with Vld. Packet content is carried on the Data signals. In this particular implementation, two packet formats exist: packets with payload (e.g., write requests, read responses), and packets without payload (e.g., all other packet types).

Example Packet

Figure 4:
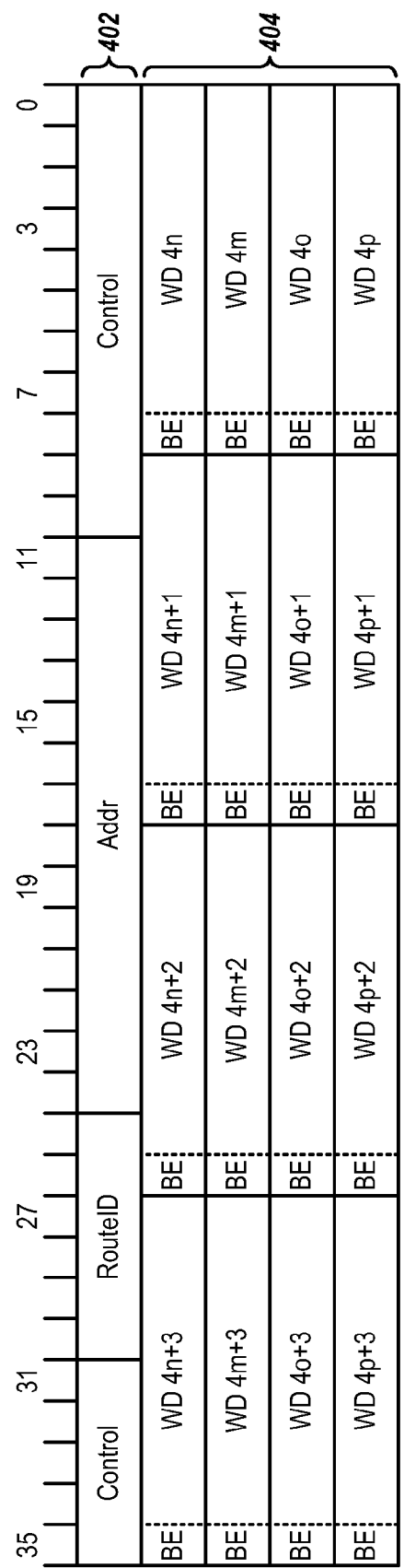
FIG. 4 is an example packet for use with the NoC of FIG. 1.

FIG. 4 is an example packet for use with NoC 100 of FIG. 1. More particularly, FIG. 4 illustrates an example packet format 400 including a header 402 and a payload 404. The example packet format 400 can be defined by four bytes (with byte-enables) of payload width and one cycle header penalty. In some implementations of the packet format 400, some fields may be optional. The total width of header 402 can be referred to as wHeader. In some implementations, header 402 includes a header field containing a RouteID, an Address field (Addr) and several Control fields. The Control fields in the header 402 can carry additional end-to-end or transport protocol information. The particular use and meaning of the Control fields in header 402 is not relevant to the discussion of the disclosed implementations. The meaning of the other fields in header 402 is explained next.

Addr: This header field indicates the start address of a transaction, expressed in bytes, in the target address space.

RouteId: This header field uniquely identifies a "initiator-mapping, target-mapping" pair. The pair can be unique information used by routing tables to steer a packet inside NoC 100. The fields in the payload of the packet can be Byte-Enable (BE) field and Data field (Byte). The meaning of these fields is explained next.

BE: Indicates one Byte Enable bit per payload byte.

Byte: This field contains the payload part of the packet. The width of this field is configurable, and in some implementations, contains at least 8 bits of data. The width of a Byte can be extended to contain additional information such as protection or security information. The width of the Byte field is defined by wByte. The way packets are transmitted on the Data signals can be defined by the two following independent parameters:

nBytePerWord: This parameter indicates a number of payload bytes transferred per clock cycle. Example legal values are 0, 1, 2, 4, 8, 16, 32, 64 and 128 bytes.

hdrPenalty: This parameter indicates how a header is transmitted on the Data signals.

In some implementations, the parameter hdrPenalty can have the following values:

1. NONE: A header is sent simultaneously with a first payload if any. The effective width of the Data signals (wData) is equal to (wByte+1)*nBytePerWord+ wHeader.
2. ONE: A header occupies exactly one clock cycle. The effective width of the Data signals is equal to max ((wByte+1)*nBytePerWord, wHeader).
3. TWO: A header occupies exactly two clock cycles, even when the header is smaller than (wByte+1) *nBytePerWord. The effective width of the Data signals is equal to max((wByte+1)*nBytePerWord, ceil (wHeader/2)).
4. AUTO: A header is automatically split to be transmitted on the (wByte+1)*nBytePerWord bits of the Data signals. The number of cycles for the header is equal to ceil(wHeader/((wByte+1)*nBytePerWord)).

Example Packet Formats

Figure 5:
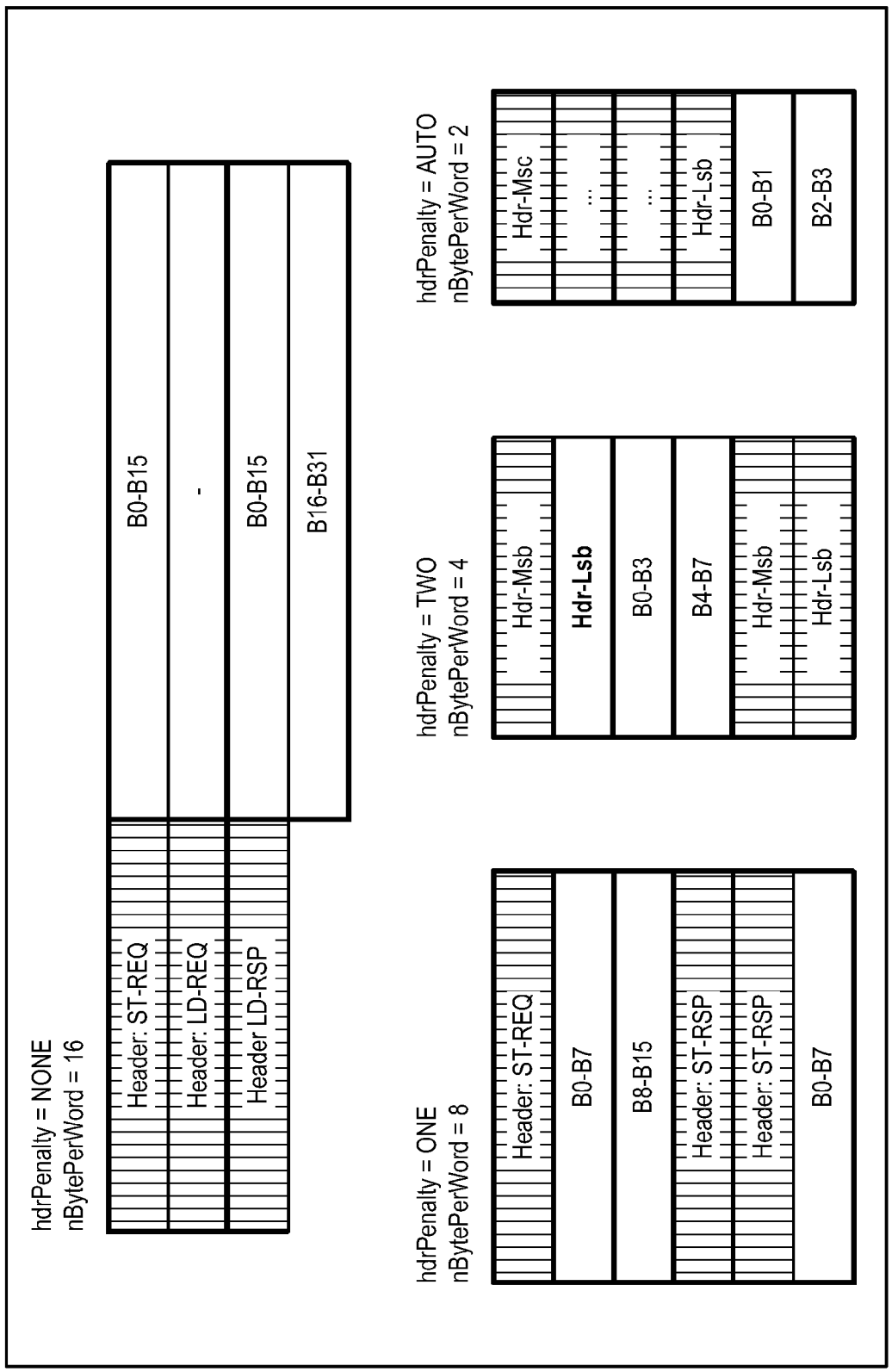
FIG. 5 illustrates example packet formats for use with the NoC of FIG. 1.
Figure 6:
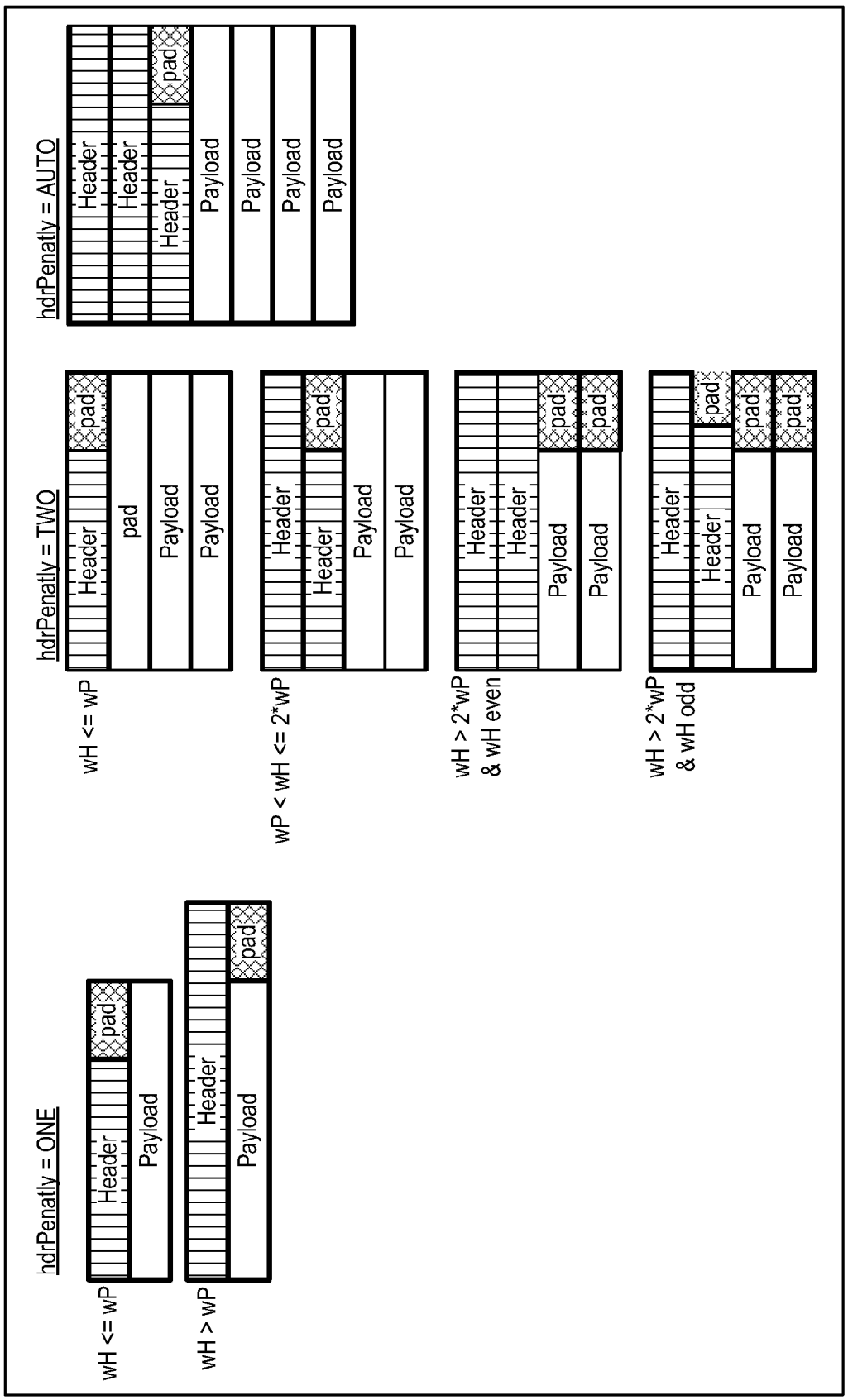
FIG. 6 illustrates an example mechanism of padding unused bits in the packet formats of FIG. 5.

FIG. 5 illustrates example packet formats for use with NoC 100 of FIG. 1. More particularly, FIG. 5 shows examples of different packet format combinations based on values of independent parameters hdrPenalty and nBytePerWord. In some implementations, a header can be split each time wHeader is greater than wData. Most significant bits can be sent first (big-endian), and least significant bits of a last Data word can be padded with zeroes when necessary. A payload can be padded with zeroes when (wByte+1) *nBytePerWord+wC<wData. Padding can occur on the least significant bits Example Padding Mechanism FIG. 6 illustrates an example mechanism of padding unused bits. The shorthand "wH" is used as an abbreviation of wHeader and "wP" of (wByte+1)*nBytePerWord.

The flexibility of the packet formats of FIG. 5 provides significant advantages to an implementation of a NoC or IP core interconnect structure. The additional flexibility allows NoC designers to implement a simple solution while still meeting latency and bandwidth requirements of the interconnect. The resulting area savings can translate directly into cost reduction of an IC or FPGA.

The option hdrPenalty=NONE can be used when low latency and/or high bandwidth are desired. This solution can be expensive in terms of wire usage, but in a modern System on a Chip (SoC) design, the number of links that require these stringent requirements is limited.

The option hdrPenalty=ONE is an option that can be used by a main interconnect in an SoC. This solution can be wire efficient while still providing high bandwidth and acceptable latency numbers.

The option hdrPenalty=TWO is an option that can be used by control and peripheral interconnect structures. This solution can provide high wire efficiency combined with somewhat reduced performance.

The option hdrPenalty=AUTO is an option that can be used by service interconnect structures where wire efficiency is an important design parameter.

In one implementation, the selection of a packet format can be made on a link-per-link basis. For example, the two independent parameters (hdrPenalty, nBytePerWord) defining the packet format can be selected differently for every link, allowing further optimization of the NoC 100. Since physical links in a NoC may have different performance requirements, a packet format can be chosen optimally for each link reducing area and power consumption.

Since a NoC for a complex SoC, such as a cell-phone application processor or video processing chip can contain many links, there are many configuration decisions that need to be managed. In one implementation, the selection of the parameters can be made through a Graphical User Interface (GUI), allowing for a quick and efficient configuration of the packet-formats and associated links.

Example Process for Transmitting Information Over Link

Figure 7:
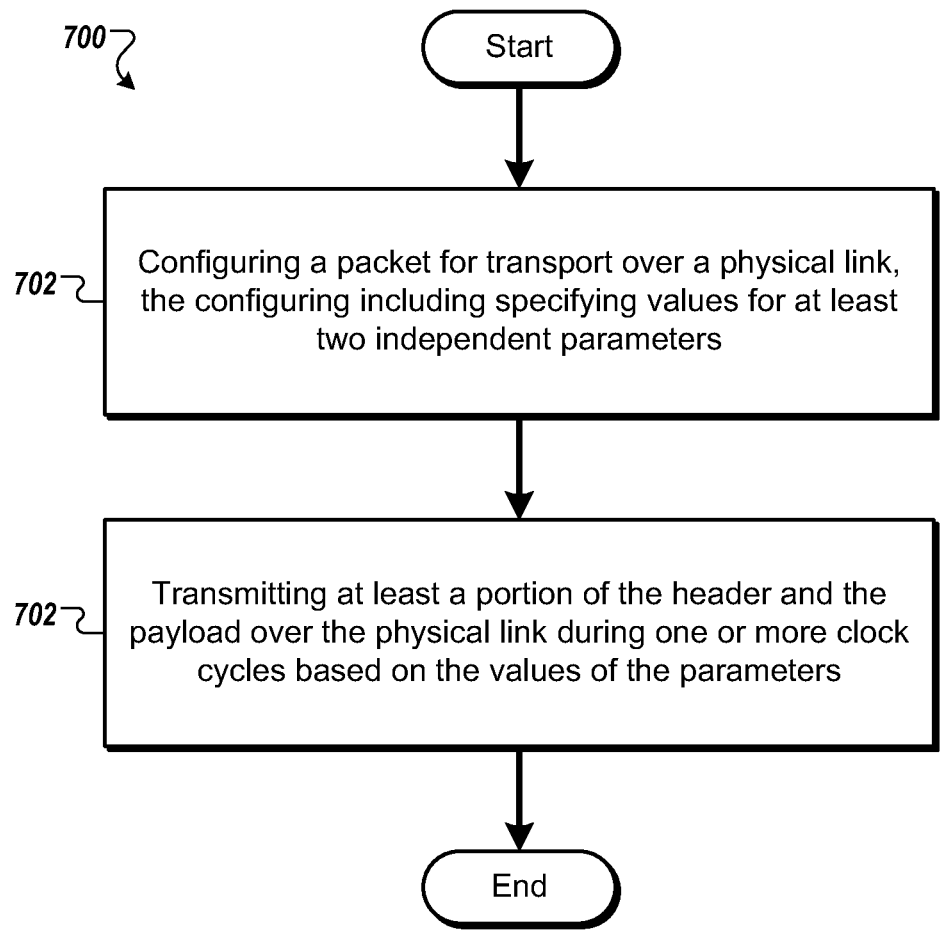
FIG. 7 is an example process for transmitting information over the link of FIG. 2 using the packet formats shown in FIG. 5.

FIG. 7 is an example process 700 for transmitting information over the physical link of FIG. 2 using the packet format shown in FIG. 5. In some implementations, the process 700 includes configuring a packet for transport over a physical link, the configuring including specifying values for at least two independent parameters (702), and transmitting at least a portion of the header and the payload over the physical link during one or more clock cycles based on the values of the parameters (702). In some implementations, a first parameter indicates a width of the physical link or a width of the payload, and a second parameter specifies a minimal latency to transport the header over the physical link that is in addition to a minimal latency to transport the payload over the physical link.

While this specification contains many specifics, these should not be construed as limitations on the scope of what is claimed or of what can be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

Thus, particular implementations have been described. Other implementations are within the scope of the following claims.

What is claimed is:

1. An integrated circuit, comprising:
a network-on-a-chip (NoC) transmitter coupled to a physical link that comprises a number of physical data wires, the number of physical data wires equal to at least a sum of a header width and a payload word width;
the NoC transmitter configured to:
format a packet based on at least two independent parameters that include the payload word width and a header latency penalty (HLP) parameter, where one of the two independent parameters is set to a value specifying that the header is automatically split for transmission over the physical link in more than one clock cycle, the packet including a header and a payload that comprises one or more payload words; and
simultaneously transmit part of the header and a first payload word over the physical link during a first clock cycle to a receiver coupled to the physical link and configured to receive the header and the payload.

2. The integrated circuit of claim 1, wherein the NoC transmitter is further configured to be directed by the HLP parameter to format the packet such that the header of the packet is sent simultaneously with the payload of the packet.

3. The integrated circuit of claim 2, wherein NoC transmitter is further configured to format the packet such that a width of data to be transmitted equals (wByte+1)*nBytePerWord+wHeader, where:
wByte=a payload width,
nBytePerWord=a number of payload bytes per clock cycle, and
wHeader=a total width of the header.

4. The integrated circuit of claim 1, wherein the NoC transmitter is further configured to be directed by the HLP parameter to format the packet such that the header of the packet occupies one clock cycle.

5. The integrated circuit of claim 4, wherein NoC transmitter is further configured to format the packet such that a width of data to be transmitted equals max((wByte+1)*nBytePerWord, wHeader), where:
wByte=a payload width,
nBytePerWord=a number of payload bytes per clock cycle, and
wHeader=a total width of the header.

6. The integrated circuit of claim 1, wherein the NoC transmitter is further configured to be directed by the HLP parameter to format the packet such that the header of the packet occupies two clock cycles.

7. The integrated circuit of claim 6, wherein NoC transmitter is further configured to format the packet such that a width of data to be transmitted equals max((wByte+1)*nBytePerWord, ceil(wHeader/2)), where:
wByte=a payload width,
nBytePerWord=a number of payload bytes per clock cycle, and
wHeader=a total width of the header.

8. The integrated circuit of claim 1, wherein the NoC transmitter is further configured to be directed by the HLP parameter to format the packet such that the header of the packet is split for transmission over more than two clock cycles.

9. The integrated circuit of claim 8, wherein NoC transmitter is further configured to format the packet such that a width of data to be transmitted equals ceil(wHeader/((wByte+1)*nBytePerWord)), where:
wByte=a payload width,
nBytePerWord=a number of payload bytes per clock cycle, and
wHeader=a total width of the header.

10. The integrated circuit of claim 1, wherein the NoC transmitter is configured to pad an unused portion of the packet.

11. The integrated circuit of claim 10, wherein the unused portion of the packet includes a least significant bit of the payload, a least significant bit of the header, or a combination thereof.

12. The integrated circuit of claim 1, wherein the NoC transmitter is a constituent component of a switch, a clock converter, a bandwidth regulator, a sync first-in first-out circuit, a width converter, an endian converter, a rate adaptor, a power isolator, or a network interface unit.

13. A method for operating a network-on-a-chip (NoC) transmitter, comprising:
receiving, at the NoC transmitter, a header latency penalty (HLP) parameter, the NoC transmitter coupled to a physical link that comprises a number of physical data wires, the number of physical data wires equal to at least a sum of a header width and a payload word width;
formatting a packet based on at least two independent parameters that include the payload word width and the HLP parameter, where one of the two independent parameters is set to a value specifying that the header is automatically split for transmission over the physical link in more than one clock cycle, the packet including a header and a payload that comprises one or more payload words; and
simultaneously transmitting part of the header and a first payload word over the physical link during a first clock cycle to a receiver coupled to the physical link and configured to receive the header and the payload.

14. The method of claim 13, wherein the formatting includes the HLP parameter directing the NoC transmitter to format the packet such that the header of the packet is configured to be sent simultaneously with the payload of the packet.

15. The method of claim 14, wherein the formatting includes the HLP parameter directing the NoC transmitter to format the packet such that a width of data to be transmitted equals (wByte+1)*nBytePerWord+wHeader, where:
wByte=a payload width,
nBytePerWord=a number of payload bytes per clock cycle, and
wHeader=a total width of the header.

16. The method of claim 13, wherein the formatting includes the HLP parameter directing the NoC transmitter to format the packet such that the header of the packet is configured to occupy one clock cycle.

17. The method of claim 16, wherein the formatting includes the HLP parameter directing the NoC transmitter to format the packet such that a width of data to be transmitted equals max((wByte+1)*nBytePerWord, wHeader), where:
wByte=a payload width,
nBytePerWord=a number of payload bytes per clock cycle, and
wHeader=a total width of the header.

18. The method of claim 13, wherein the formatting includes the HLP parameter directing the NoC transmitter to format the packet such that the header of the packet is configured to occupy two clock cycles.

19. The method of claim 18, wherein the formatting includes the HLP parameter directing the NoC transmitter to format the packet such that a width of data to be transmitted equals max((wByte+1)*nBytePerWord, ceil(wHeader/2)), where:
wByte=a payload width,
nBytePerWord=a number of payload bytes per clock cycle, and
wHeader=a total width of the header.

20. The method of claim 13, wherein the formatting includes the HLP parameter directing the NoC transmitter to format the packet such that the header of the packet is configured to occupy more than two clock cycles.

21. The method of claim 20, wherein the formatting includes the HLP parameter directing the NoC transmitter to format the packet such that a width of data to be transmitted equals ceil(wHeader/((wByte+1)*nBytePerWord)), where:
wByte=a payload width,
nBytePerWord=a number of payload bytes per clock cycle, and
wHeader=a total width of the header.

22. The method of claim 13, further comprising padding an unused portion of the payload of the packet, padding an unused portion of the header of the packet, or a combination thereof.

23. The method of claim 22, wherein the unused portion of the payload includes a least significant bit of the payload, the unused portion of the header includes a least significant bit of the header, or a combination thereof.

24. A network-on-a-chip (NoC) transmitter, comprising:
means for receiving, at the NoC transmitter, a header latency penalty (HLP) parameter, the NoC transmitter coupled to a physical link that comprises a number of physical data wires, the number of physical data wires equal to at least a sum of a header width and a payload word width; and
means for formatting a packet based on at least two independent parameters that include the payload word width and the HLP parameter, where one of the two independent parameters is set to a value specifying that the header is automatically split for transmission over the physical link in more than one clock cycle, the packet including a header and a payload that comprises one or more payload words; and
means for simultaneously transmitting part of the header and a first payload word over the physical link during a first clock cycle to a receiver coupled to the physical link and configured to receive the header and the payload.

25. The NoC transmitter of claim 24, wherein the means for formatting includes means for formatting the packet such that the header of the packet is configured to be sent simultaneously with the payload of the packet.

26. The NoC transmitter of claim 24, wherein the means for formatting includes means for formatting the packet such that the header of the packet is configured to occupy one clock cycle.

27. The NoC transmitter of claim 24, wherein the means for formatting includes means for formatting the packet such that the header of the packet is configured to occupy two clock cycles.

28. The NoC transmitter of claim 24, wherein the means for formatting includes means for formatting the packet such that the header of the packet is configured to occupy more than two clock cycles.

29. The NoC transmitter of claim 24, further comprising means for padding an unused portion of the packet.

30. The NoC transmitter of claim 29, wherein the unused portion of the packet includes a least significant bit of the payload, a least significant bit of the header, or a combination thereof.

* * * * *